(12) United States Patent  (10) Patent No.: US 8,502,402 B2
Hamano  (45) Date of Patent: Aug. 6, 2013

(54) POWER GENERATING APPARATUS OF RENEWABLE ENERGY TYPE AND CONTROL METHOD THEREOF

(75) Inventor: Fumio Hamano, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/398,525

(22) Filed: Feb. 16, 2012

(65) Prior Publication Data

US 2013/0134708 A1  May 30, 2013

Related U.S. Application Data

(63) Continuation of application No. PCT/JP2011/077624, filed on Nov. 30, 2011.

(51) Int. Cl.
*F03D 9/00* (2006.01)
*F03D 7/04* (2006.01)
*F04B 17/02* (2006.01)

(52) U.S. Cl.
USPC .......................................................... 290/43

(58) Field of Classification Search
None
See application file for complete search history.

(56) References Cited

U.S. PATENT DOCUMENTS

| 4,299,298 A | 11/1981 | McEnery et al. |
| 5,621,776 A | 4/1997 | Gaubatz |
| 6,265,785 B1 | 7/2001 | Cousineau et al. |
| 6,370,438 B1 | 4/2002 | Rocchia et al. |
| 2003/0137998 A1 | 7/2003 | Miura et al. |
| 2005/0253396 A1* | 11/2005 | Mikhail et al. ................. 290/44 |
| 2007/0189900 A1 | 8/2007 | Rogall et al. |
| 2009/0140522 A1 | 6/2009 | Chapple et al. |
| 2010/0040470 A1 | 2/2010 | Nies et al. |
| 2011/0142596 A1* | 6/2011 | Nies ............................... 415/13 |
| 2011/0187107 A1 | 8/2011 | Toyohara et al. |

FOREIGN PATENT DOCUMENTS

| JP | H06-051808 A | 2/1994 |
| JP | 2004-118265 A | 4/2004 |
| JP | 2004-218436 A | 8/2004 |
| JP | 2004-266883 A | 9/2004 |
| JP | 2005-061300 | 3/2005 |

* cited by examiner

*Primary Examiner* — Tulsidas C Patel
*Assistant Examiner* — Sean Gugger
(74) *Attorney, Agent, or Firm* — Manabu Kanesaka; Kenneth M. Berner; Benjamin J. Hauptman

(57) ABSTRACT

A power generating apparatus of renewable energy type includes a rotation shaft, a hydraulic pump, a hydraulic motor, a generator and a pitch drive unit. When a fault even occurs, a deviation of a state indicating an operation state from a normal state value is calculated. When the deviation is not less than a first threshold value, the stop control unit performs by means of a hard-wired circuit at least one of switching the hydraulic pump to an idle state, the hydraulic motor to an idle state, and the pitch angle toward a feathering position. When the deviation is less than the first threshold and not less than a second threshold, the stop control unit performs by software control all of switching the hydraulic pump to the idle state, the hydraulic motor to the idle state, and the pitch angle toward the feathering position.

14 Claims, 8 Drawing Sheets

FIG. 10

| FAULT EVENT | PITCH | HYDRAULIC PUMP | HYDRAULIC MOTOR | OTHER CONTROL |
|---|---|---|---|---|
| POWER FAILURE | FEATHER | MAINTAIN AND IDLE | INST. IDLE | DISCONNECT GENERATOR |
| HP OIL LINE PRESSURE DECLINE | FEATHER | ULTIMATELY IDLE | ULTIMATELY IDLE | — |
| HEAD TANK LEVEL DECLINE | FEATHER | ULTIMATELY IDLE | ULTIMATELY IDLE | — |
| HP ACCUMULATOR PRESSURE INCREASE | — | — | — | DISCONNECT GENERATOR |

000
POWER GENERATING APPARATUS OF RENEWABLE ENERGY TYPE AND CONTROL METHOD THEREOF

TECHNICAL FIELD

The present invention relates to a power generating apparatus of renewable energy type which transmits rotation energy of a rotor to a generator via a hydraulic transmission including a hydraulic pump and a hydraulic motor and an operation method thereof. The power generating apparatus of renewable energy type generates power from renewable energy such as wind, tidal current, ocean current and river current and, the power generating apparatus of renewable energy type, for instance, includes a wind turbine generator, a tidal generator, an ocean current generator, a river current generator or the like.

BACKGROUND ART

In recent years, from a perspective of preserving the environment, it is becoming popular to use a power generating apparatus of renewable energy type such as a wind turbine generator utilizing wind power and a power generating apparatus utilizing tidal current, ocean current or river current. In the power generating apparatus of renewable energy type, the kinetic energy of the wind, tidal current, river current or the like is converted to the rotation energy of the rotor and the rotation energy of the rotor is then converted into electric power by the generator.

In this type of power generating apparatus of renewable energy type, when there is a fault event in the apparatus itself or peripheral devices, an emergency stop is activated to avoid damages, life decline, or performance decline of the device and further to ensure the safety.

A method of stopping a power generating apparatus of renewable energy type, disclosed in Patent Literature 1 is a wind turbine generator which decelerates a rotor using a mechanical brake. Another method disclosed in Patent Literature 2 is to decelerate a blade by controlling its pitch angle toward a feathering position using a pitch control unit. As a method with a combination of the above methods, Patent Literature 3 proposes to use a pitch brake by a pitch angle control of the blade along with a mechanical brake.

In recent years, a power generating apparatus of renewable energy type using a hydraulic transmission with a combination of a hydraulic pump and a hydraulic motor is gaining popularity.

For instance, Patent Literature 4 provides a wind turbine generator equipped with a hydraulic transmission with a combination of a hydraulic pump driven by rotation of the rotor and a hydraulic motor connected to a generator. In this wind turbine generator, the hydraulic pump and the hydraulic motor are connected via an operating oil flow path and rotation energy of the rotor is transmitted to the generator via the hydraulic transmission.

CITATION LIST

Patent Literature

[Patent Literature 1] US 2007/0189900
[Patent Literature 2] JP 2010-156318 A
[Patent Literature 3] U.S. Pat. No. 6,265,785
[Patent Literature 4] US 2010/0040470

SUMMARY OF INVENTION

Technical Problem

In a hydraulic transmission such as the one disclosed in Patent Literature 4, in case of occurrence of the fault event, the rotation of the rotor needs to be stopped by the pitch brake or the like as well as the hydraulic pump and the hydraulic motor.

However, performing the emergency stop at the fault event which requires the emergency stop, by suddenly putting on the pitch brake or by suddenly shifting the hydraulic motor and the hydraulic pump into an idle state, causes issues such as overloading the devices and decreasing durability thereof.

In view of the above issues, it is an object of the present invention is to provide a power generating apparatus of renewable energy type which, when the fault event occurs, can perform a stop control in accordance to an operation state and reduce the load on the devices caused by the stop control while ensuring the safety, and a control method thereof.

Solution to Problem

In view of the above issues, the present invention provides a power generating apparatus of renewable energy type which may include, but is not limited to:
 a rotation shaft which is rotated with a blade by renewable energy;
 a hydraulic pump which is driven by the rotation shaft to increase a pressure of operating oil;
 a hydraulic motor which is driven by the operating oil having been pressurized by the hydraulic pump;
 a generator which is coupled to the hydraulic motor;
 a pitch drive mechanism which adjusts a pitch angle of the blade;
 a monitor unit which obtains a state value indicating an operation state of the power generating apparatus of renewable energy type; and
 a stop control unit which stops the power generating apparatus of renewable energy type when a fault event occurs, and
 when a deviation of the state value obtained by the monitor unit from a normal value which is a state value during a normal operation is not less than a first threshold value, the stop control unit may perform by means of a hard-wired circuit at least one of: switching the hydraulic pump to an idle state; switching the hydraulic motor to an idle state; and switching the pitch angle toward a feathering position using the pitch drive mechanism, and
 when the deviation is less than the first threshold and not less than a second threshold which is closer to the normal value than the first threshold, the stop control unit may perform by software control all of: switching the hydraulic pump to the idle state; switching the hydraulic motor to the idle state; and switching the pitch angle toward the feathering position using the pitch drive mechanism.

According to the present invention, the state value indicating the operation state of the power generating apparatus of renewable energy type is obtained by the monitor unit and depending on a degree of the deviation of the state value from the normal value, different stop controls are performed by the stop control unit. More specifically, when the deviation of the state value is not less than the first threshold, the stop control unit performs by means of a hard-wired circuit at least one of: switching the hydraulic pump to the idle state; switching the hydraulic motor to the idle state; and switching the pitch angle toward the feathering position using the pitch drive mechanism. In this manner, when the fault event is particularly severe compared to other fault events, the stop control is performed using the hard-wired circuit. By this, the power generating apparatus of renewable energy type can be firmly stopped.

In contrast, when the deviation is less than the first threshold and not less than the second threshold which is closer to the normal value than the first threshold, the stop control unit performs by software control all of; switching the hydraulic pump to the idle state; switching the hydraulic motor to the idle state; and switching the pitch angle toward the feathering position using the pitch drive mechanism. In this manner, when the operation state is comparatively close to the normal operation state among the fault events, the stop control is performed using the software control. By this, it is possible to avoid sudden stop of the devices, thereby reducing additional load on the devices. Particularly, when performing the stop control by switching the hydraulic pump or the hydraulic motor to the idle state, the control can be performed in a manner similar to the normal operation and thus, it is possible to prevent the life reduction of the hydraulic pump or the hydraulic motor. Further, with use of the software control, it is possible to perform the stop control according to the normal operation sequence. Thus, once the cause of the fault event is removed, it is possible to quickly restart the apparatus, thereby avoiding significant decline of the operation rate. Furthermore, instead of leaving the situation until it gets so serious that the apparatus needs to be stopped using the hard-wired circuit, the situation is handled by the software control before it gets serious and thus, the power generating apparatus of renewable energy type can be stopped without excess load on the devices.

The hard-wired circuit, herein, refers to a circuit configured to perform the command by a physical wire connection.

In the above power generating apparatus of renewable energy type, the state value may be at least one of a rotation speed of the hydraulic pump, a rotation speed of the hydraulic motor and an output of the generator.

In the above power generating apparatus of renewable energy type, the stop control unit may switch the pitch angle toward the feathering position at a higher speed when the deviation is not less than the first threshold than when the deviation is not less than the second threshold and less than the first threshold.

In this manner, when the deviation is not less than the first threshold, the operation state is particularly server among the fault events and thus, it is the first priority to stop the apparatus as quickly as possible. By switching the pitch angle toward the feathering position at a high speed and then activating the pitch brake, it is possible to stop the apparatus faster.

In the above power generating apparatus of renewable energy type, the hydraulic pump may include, but is not limited to:

a plurality of working chambers each of which is surrounded by a cylinder and a piston and which is filled with the operating oil; and a cam which causes the pistons of the working chambers to move upward and downward between a top dead center and a bottom dead center with phase differences, and when the deviation is not less than the first threshold, the stop control unit may switch all of the working chambers simultaneously to a disabled state so as to stop the hydraulic pump instantaneously, and when the deviation is not less than the second threshold and less than the first threshold, the stop control unit switches the working chambers sequentially to the disabled state at a timing when the piston of each of the working chambers reaches the top dead center or the bottom dead center.

As described above, when the deviation is not less than the first threshold, it is the first priority to stop the apparatus as quickly as possible. Thus, by switching all of the working chambers simultaneously to the disabled state so as to stop the hydraulic pump instantaneously, hence ensuring the safety. However, the pistons move upward and downward with phase differences and some working chambers might be switched to the disabled state although the corresponding pistons are not positioned at the top dead center or the bottom dead center. Switching of the working chambers to the idle state at such timing can cause unexpected load on component devices of the hydraulic pump. Therefore, when the deviation is not less than the second threshold and less than the first threshold, which does not necessarily require the emergency stop, the working chambers are switched sequentially to the disabled state at a timing when the piston of each of the working chambers reaches the top dead center or the bottom dead center. By this, it is possible to avoid unexpected road acting on the component device and thus to prevent the life reduction of the hydraulic pump and the hydraulic motor.

In the above power generating apparatus of renewable energy type, when the fault event occurs in one of the hydraulic pump and the hydraulic motor, the stop control unit may switch the one of the hydraulic pump and the hydraulic motor to the idle state and maintains the other of the hydraulic pump and the hydraulic motor in an operation state for a set period of time even after the one of the hydraulic pump and the hydraulic motor is switched to the idle state.

In this manner, whichever one of the hydraulic pump and the hydraulic motor where there is fault event, may be stopped, whereas the other one where there is no fault event does not necessarily have to be stopped and thus is maintained in the operation state for at least the set period of time. For instance, the hydraulic motor is kept in the operation state for the set period of time, the hydraulic motor performs work for an amount corresponding to residual energy in the high pressure oil line as long as the generator is connected to the grid. The pressure gradually declines as time passes and the hydraulic motor is switched to the idle state and accordingly the output of the generator declines. In other words, the hydraulic motor continues to drive the generator until it is switched to the idle state, hence improving the power generation efficiency. Meanwhile, by maintaining the hydraulic pump in the operation state for the set period of time, a controlling force by the hydraulic pump is applied to the rotor meanwhile so as to assist the pitch brake.

In the above power generating apparatus of renewable energy type, in such a case the state value is a rotation speed of one of the hydraulic pump and the hydraulic motor and the state value is less than the second threshold, when the fault event occurs in the one of the hydraulic pump and the hydraulic motor, the pitch angle may be switched toward the feathering position using the pitch drive mechanism and the one of the hydraulic pump and the hydraulic motor is switched to the idle state.

In this manner, even when the state value is less than the second threshold, the stop control is performed once the fault event occurs. More specifically, a three-stage stop control is provided: the stop control by the hard-wired circuit when the state value is not less than the first threshold; the stop control by the software control when the state value is less than the first threshold and not less than the second threshold; and the stop control depending on the fault event even when the state value is less than the second threshold. This improves the reliability of the stop control.

In the above power generating apparatus of renewable energy type, in such a case the state value is a rotation speed of the hydraulic motor and the state value is less than the second threshold, when a power failure occurs in a grid to which the generator is connected, the stop control unit may switch the hydraulic motor to the idle state and disconnects the generator from the grid.

In this manner, even when the state value is less than the second threshold, once the power failure occurs in the grid connected to the generator, the stop control unit switches the hydraulic motor to the idle state and disconnects the generator from the grid. By this, it is possible to prevent over-rotation of the generator.

As descried above, when the power failure occurs in the grid, the stop control unit may switch the hydraulic motor to the idle state and switch the pitch angle toward the feathering position by actuation of the pitch drive unit, and may maintain the hydraulic pump in an operation state even after the hydraulic motor is switched to the idle state and the pitch angle is switched toward the feathering position.

In this manner, when the power failure occurs In the grid, the hydraulic motor is switched to the idle state to protect the hydraulic motor and the generator, and the brake is activated by the pitch drive unit to stop the rotation of the rotor. Thus, the safety is ensured. In this process, even after the hydraulic motor is switched to the idle state and the pitch angle is switched toward the feathering position, the hydraulic pump is maintained in an operation state. Meanwhile, the controlling force (torque) is applied to the rotor to assist the pitch brake.

The above power generating apparatus of renewable energy type, may further include:

a high pressure oil line which connects an outlet of the hydraulic pump and an inlet of the hydraulic motor, and when a pressure of the high pressure oil line stays below a set lower limit for a predetermined period of time, the stop control unit may switch the pitch angle toward the feathering position by actuation of the pitch drive unit and may switch the hydraulic pump and the hydraulic motor to the idle state.

When the pressure of the high pressure oil line stays below the set lower limit for the predetermined period of time, it is assumed that there is operating oil leaking due to breakage of the piping of the hydraulic transmission. The operating oil is partially supplied to the bearings of the hydraulic pump and the hydraulic motor to function as lubricant oil. Thus, noticeable leaking of the operating oil may lead to lack of lubricant oil being supplied to the bearings. In view of this, to protect the bearings, the stop control for the power generating apparatus of renewable energy type is performed by switching the pitch angle toward the feathering position and switching the hydraulic pump and the hydraulic motor ultimately to the idle state, thereby stopping the apparatus.

In the above power generating apparatus of renewable energy type, the state value may be a rotation speed of the hydraulic motor, and the first threshold may be set lower than a rotation speed of the hydraulic motor which corresponds to a maximum rotation speed of the generator expected in such a case that the fault event occurs when the generator during a rated load operation is disconnected from a grid.

By setting the first threshold as described above, the generator can be stopped before reaching its maximum rotation speed even when the generator is disconnected from the grid, hence preventing the generator from being damaged.

The above power generating apparatus of renewable energy type may further include:

a high pressure oil line which connects an outlet of the hydraulic pump and an inlet of the hydraulic motor;

a low pressure oil line which connects an inlet of the hydraulic pump and an outlet of the hydraulic motor;

a high pressure accumulator which is connected to the high pressure oil line;

a low pressure accumulator which is connected to the low pressure oil line; and a bypass line which communicates with the high pressure accumulator and the low pressure accumulator, and when a pressure of the high pressure accumulator exceeds a set value, the stop control unit may release the operating oil from the high pressure accumulator to the low pressure accumulator via the bypass line.

When the pressure of the high pressure accumulator exceeds the set value, the pressure could continue to exceed beyond a maximum allowable pressure specified fro the high pressure accumulator. Thus, in such case, the operating oil is released from the high pressure accumulator to the low pressure accumulator via the bypass line so as to lower the pressure in the high pressure accumulator, thereby solving the fault event.

The above power generating apparatus of renewable energy type may further include:

a head tank which supplies lubricant oil to a bearing of at least one of the rotation shaft and an output shaft which connects the hydraulic motor and the generator, and when one of a pressure and an amount of the lubricant oil in the head tank becomes lower than a set value, the stop control unit may switch the pitch angle toward the feathering position by actuation of the pitch drive unit and switches the hydraulic pump and the hydraulic motor to the idle state.

When the lubricant oil leaks from the head tank or its piping, the lubricant oil is not supplied sufficiently to the bearings of the rotation shaft and the output shaft, causing damages to the bearings. Thus, when one of the pressure and the amount of the lubricant oil in the head tank becomes lower than the set value, the pitch angle is switched toward the feathering position by actuation of the pitch drive unit and the hydraulic pump and the hydraulic motor are switched to the idle state. By this, it is possible to stop the power generating apparatus of renewable energy type before the bearings are damaged.

Further, the power generating apparatus of renewable energy type may be a wind turbine generator which generates power from wind in a form of the renewable energy.

The present invention also provides a control method of a power generating apparatus of renewable energy type which includes a rotation shaft rotated with a blade by renewable energy, a hydraulic pump driven by the rotation shaft to increase a pressure of operating oil, a hydraulic motor driven by the operating oil having been pressurized by the hydraulic pump, a generator coupled to the hydraulk motor, a pitch drive mechanism adjusting a pitch angle of the blade, the method including, but not limited to, the steps of:

obtaining a state value which indicates an operation state of the power generating apparatus of renewable energy type; and stopping the power generating apparatus of renewable energy type when a fault event occurs, and in the stopping step, when a deviation of the state value obtained in the obtaining step from a normal value which is a state value during a normal operation is not less than a first threshold value, at least one of: switching the hydraulic pump to an idle state; switching the hydraulic motor to an idle state;

and switching the pitch angle toward a feathering position using the pitch drive mechanism, may be performed by means of a hard-wired circuit, and in the stopping step, when the deviation is less than the first threshold and not less than a second threshold which is closer to the normal value than the first threshold, all of: switching the hydraulic pump to the idle state; switching the hydraulic motor to the idle state; and switching the pitch angle toward the feathering position using the pitch drive mechanism, may be performed by means of software control.

According to the present invention, the state value indicating the operation state of the power generating apparatus of renewable energy type is obtained and depending on a degree of the deviation of the state value from the normal value, different stop control is performed. More specifically, when the deviation of the state value is not less than the first threshold and the fault event is particularly severe compared to other fault events, the stop control is performed using the hard-wired circuit. By this, the power generating apparatus of renewable energy type can be positively stopped.

In contrast, when the deviation is less than the first threshold and not less than the second threshold which is closer to the normal value than the first threshold and the operation state is comparatively close to the normal operation state among the fault events, the stop control is performed using the software control. By this, it is possible to avoid sudden stop of the devices, thereby reducing additional load on the devices. Particularly, when performing the stop control by switching the hydraulic pump or the hydraulic motor to the idle state, the control can be performed in a manner similar to the normal operation and thus, it is possible to prevent the life reduction of the hydraulic pump or the hydraulic motor. Further, with use of the software control, it is possible to perform the stop control according to the normal operation sequence. Thus, once the cause of the fault event is removed, it is possible to quickly restart the apparatus, thereby avoiding significant decline of the operation rate.

Advantageous Effects of Invention

According to the present invention, the state value indicating the operation state of the power generating apparatus of renewable energy type is obtained and depending on a degree of the deviation of the state value from the normal value, different stop control is performed. More specifically, when the deviation of the state value is not less than the first threshold and the fault event is particularly severe compared to other fault events, the stop control is performed using the hard-wired circuit. By this, the power generating apparatus of renewable energy type can be positively stopped.

In contrast, when the deviation is less than the first threshold and not less than the second threshold which is closer to the normal value than the first threshold and the operation state is comparatively close to the normal operation state among the fault events, the stop control is performed using the software control. By this, it is possible to avoid sudden stop of the devices, thereby reducing additional load on the devices. Further, instead of leaving the situation until it gets so serious that the apparatus needs to be stopped using the hard-wired circuit, the situation is handled by means of the software control before it gets too serious and thus, the power generating apparatus of renewable energy type can be stopped without excess load acting on the devices.

The hard-wired circuit, herein, refers to a circuit configured to perform the command by a physical wire connection.

BRIEF DESCRIPTION OF DRAWINGS

FIG. 10 shows fault events when a third stop mode is applied and corresponding stop controls.

DESCRIPTION OF EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present invention.

Figure 1:
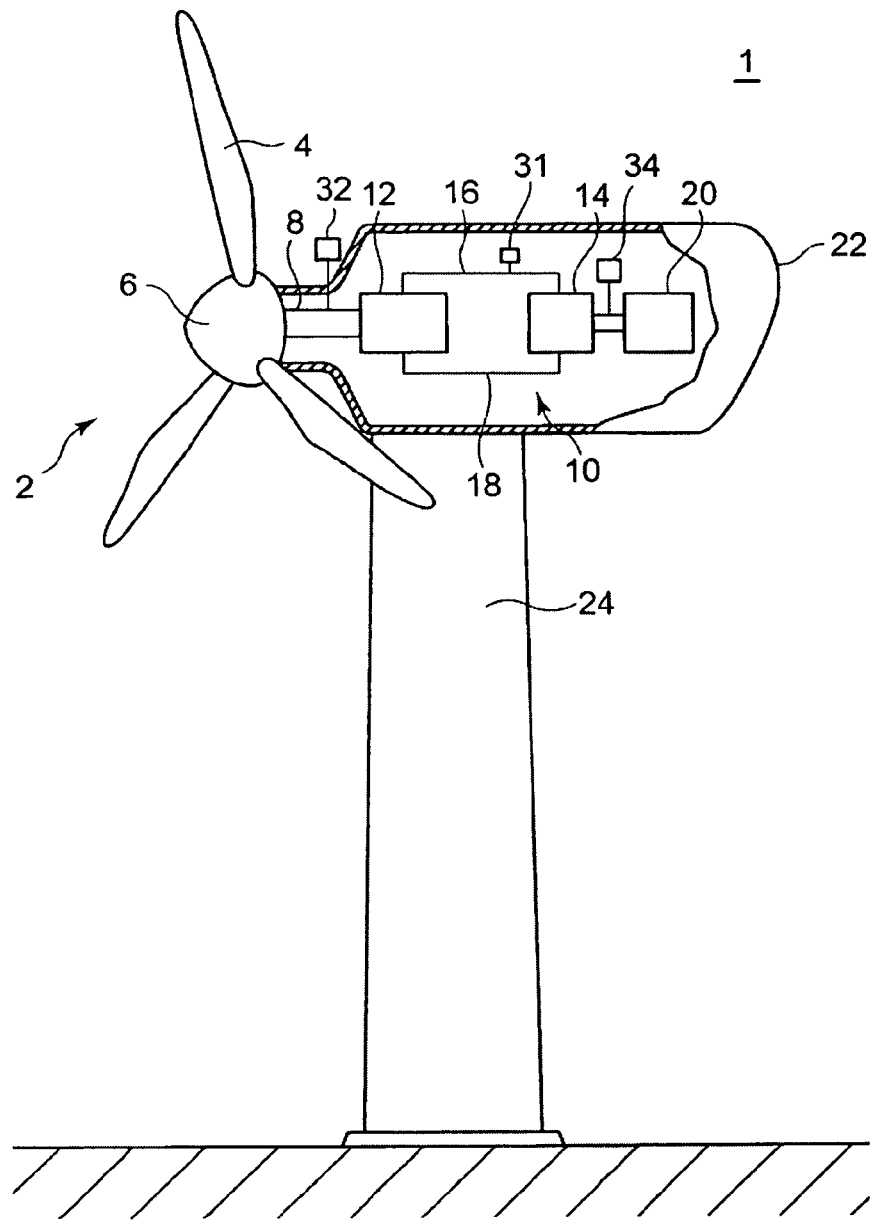
FIG. 1 is a schematic view showing an example of an overall structure of a wind turbine generator.
Figure 2:
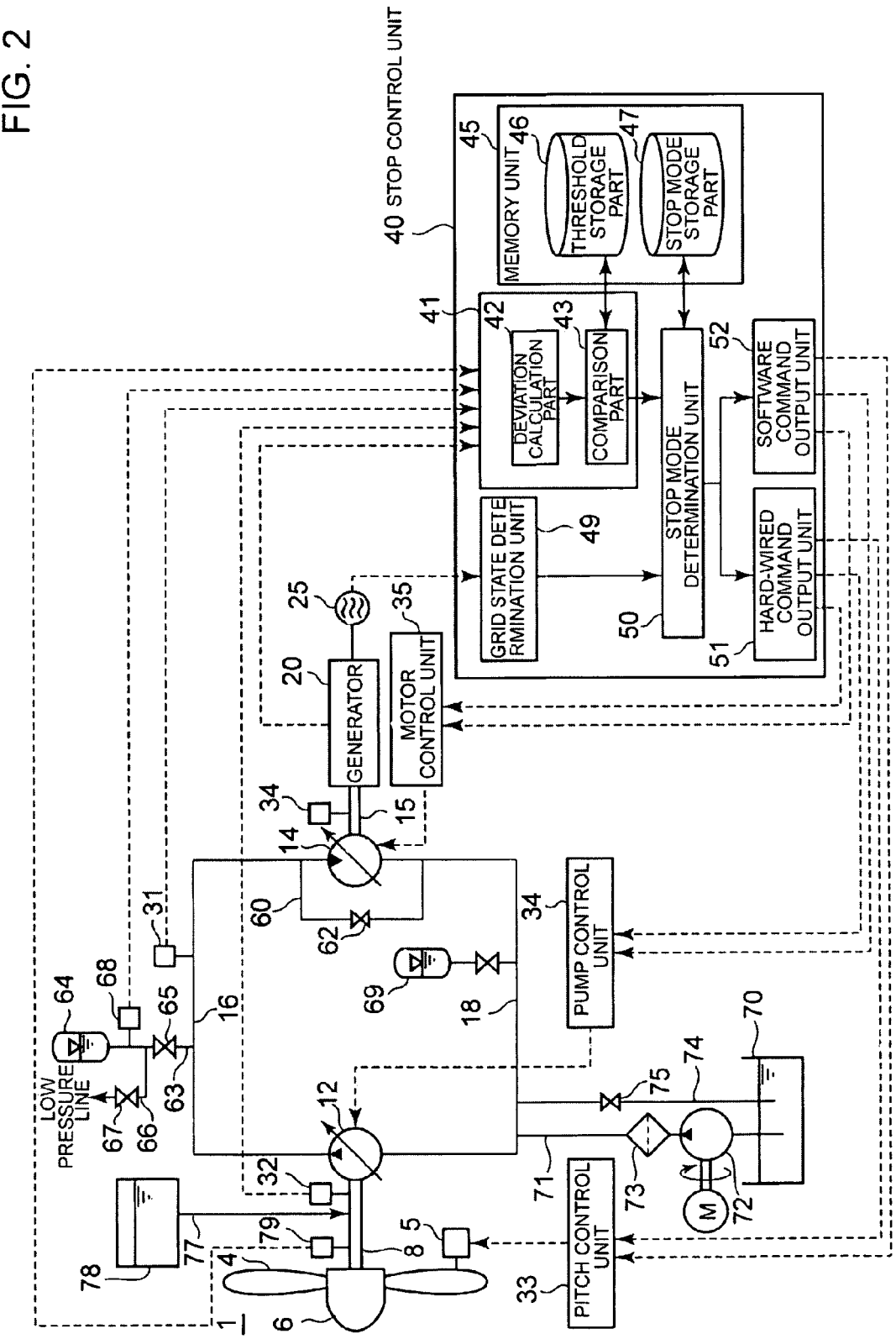
FIG. 2 illustrates a configuration of a hydraulic transmission and a stop control unit of the wind turbine generator.
Figure 3:
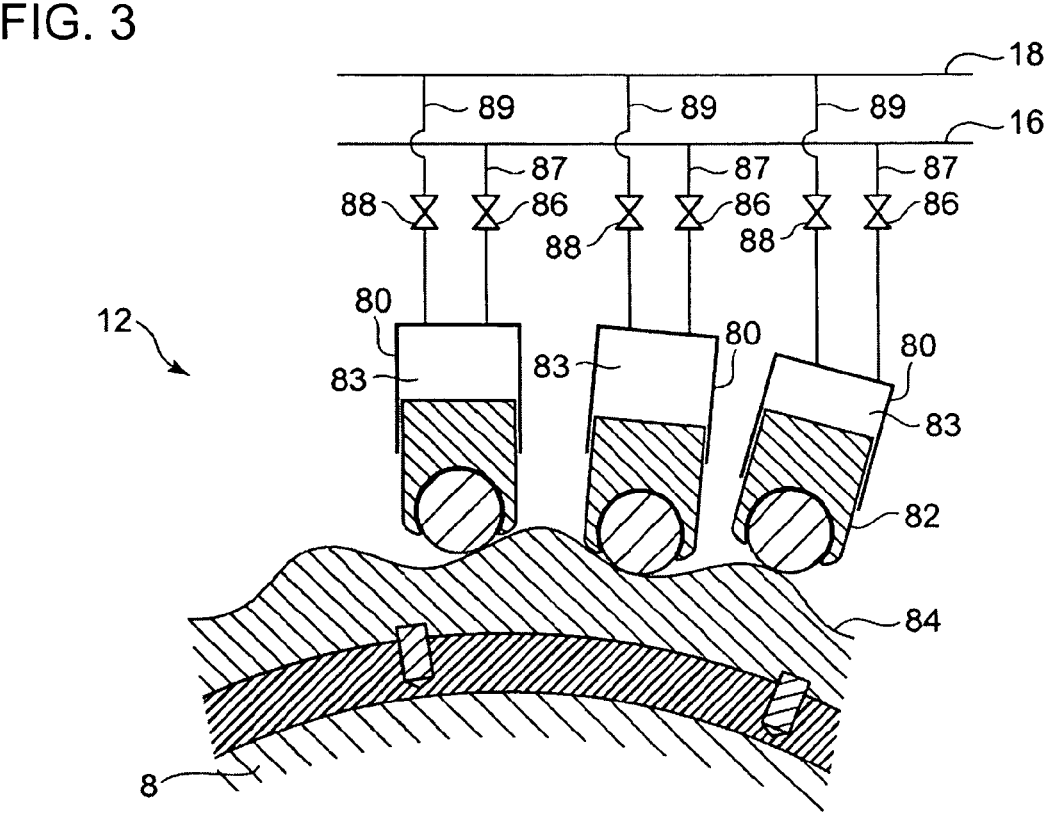
FIG. 3 illustrates a specific configuration example of a hydraulic pump.
Figure 4:
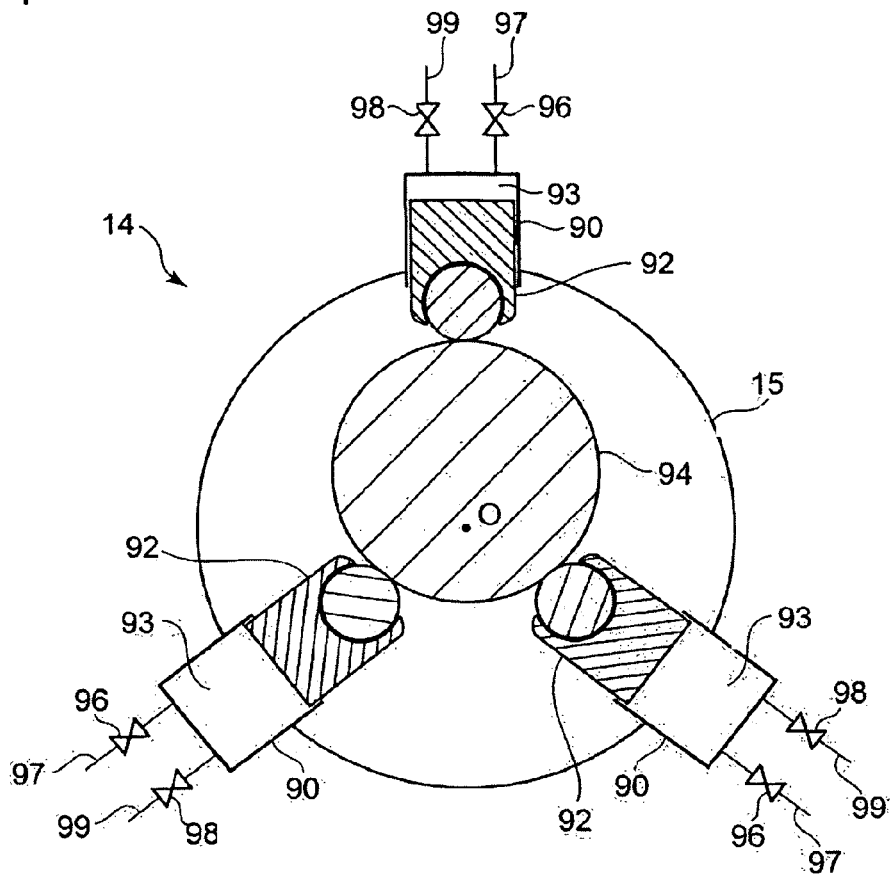
FIG. 4 illustrates a specific configuration example of a hydraulic motor.

FIG. 1 is a schematic view showing an example of an overall structure of a wind turbine generator. FIG. 2 illustrates a configuration of a hydraulic transmission and a stop control unit of the wind turbine generator. FIG. 3 illustrates a specific configuration example of a hydraulic pump. FIG. 4 illustrates a specific configuration example of a hydraulic motor.

As shown in FIG. 1, a wind turbine generator 1 mainly includes a rotor 2 rotated by the wind, a hydraulic transmission 10 which increases the rotation speed of the rotor 2, a generator 20 which is connected to a grid 25, each control unit including a stop control unit 40 (see FIG. 2), and a variety of sensors including a rotation speed sensor 32, 34.

The hydraulic transmission 10 and the generator 20 may be housed in a nacelle 22 or in a tower 24 supporting the nacelle 22. FIG. 1 shows the offshore wind turbine generator whose tower 24 is installed on the ground. However, this is not limitative and the wind turbine generator 1 may be installed in any place including offshore.

The rotor 2 is configured such that a rotation shaft 8 is coupled to a hub 6 to which a blade 4 is mounted. More specifically, three blades 4 extend radially around the hub 6 and each blade 4 is mounted to the hub 6 which is coupled to the rotation shaft 8. To the blade 4, an actuator (a pitch drive mechanism) 5 is attached to adjust the pitch angle of the blade 4 (see FIG. 2). The actuator 5 is controlled by a control signal from a pitch control unit 33. By this, the entire rotor 2 rotates by wind power received by the blades 4 and the rotation of the rotor 2 is inputted to the hydraulic transmission 10 via the rotation shaft 8.

As shown in FIG. 2, the hydraulic transmission 10 includes a hydraulic pump 12 of variable displacement type which is driven by the rotation shaft 8, a hydraulic motor 14 of a variable displacement type with an output shaft 15 which is connected to the generator 20, and a high pressure line 16 and a low pressure line 18 which are provided between the hydraulic pump 12 and the hydraulic motor 14.

The high pressure oil line 16 connects an outlet side of the hydraulic pump 12 to an inlet side of the hydraulic motor 14. The low pressure oil line 18 connects an inlet side of the hydraulic pump 12 to an outlet side of the hydraulic motor 14.

The operating oil (high pressure oil) discharged from the hydraulic pump 12 enters the hydraulic motor 14 via the high pressure oil line 16 to drive the hydraulic motor 14. The operating oil (low pressure oil) having worked in the hydraulic motor 14 then enters the hydraulic pump 12 via the low pressure line 18 where the operating oil is pressurized. The pressurized operating oil then enters the hydraulic motor 14 again via the high pressure oil line 16.

In reference to FIG. 3 and FIG. 4, specific configuration examples of the hydraulic pump 12 and the hydraulic motor 14 are explained.

The hydraulic pump 12 may be configured, as shown in FIG. 3, with a plurality of working chambers 83 surrounded by cylinders 80 and pistons 82, a ring cam 84 which has a cam curve engaging with the pistons 82, and a high pressure valve 86 and a low pressure valve 88 which are provided fro each working chamber 83. The high pressure valve 86 is arranged in a high pressure communication path 87 between each working chamber 83 and the high pressure oil line 16. The low pressure valve 88 is arranged in a low pressure communication path 89 between each working chamber 83 and the low pressure oil line 18. Herein, a check valve is used as the high pressure valve 86 to allow only a flow of the operating oil flowing from the working chamber 83 to the high pressure oil line 16 and an electromagnetic valve is used as the low pressure valve 88.

During operation of the hydraulic pump 12, the rotation of the ring cam 84 rotating with the rotation shaft 8, causes the pistons 82 to move upward and downward along the cam curve. The piston 82 repeats a pump stroke where the piston 82 moves from the bottom dead center to the top dead center and an intake stroke where the piston 82 moves from the top dead center to the bottom dead center. Therefore, the volume of the working chamber 83 formed by the piston 82 and an inner wall of the cylinder 80 changes periodically.

In the hydraulic pump 12, a state of each working chamber 83 can be switched between an active state and an idle state by controlling opening and closing of the high pressure valve 86 and the low pressure valve 88. When the working chamber 83 is in the active state, the high pressure valve 86 is closed and the low pressure valve 88 is opened in the intake stroke to feed the operating oil into the working chamber 83 from the low pressure oil line 18, and the high pressure valve 86 is opened and the low pressure valve 88 is closed in the pump stroke to discharge the pressurized operating oil from the working chamber 83 to the high pressure oil line 16. In contrast, when the working chamber 83 is in the idle state, the high pressure valve 86 is kept closed and the low pressure valve 88 is kept open in both the intake stroke and the pump stroke, to circulate the operating oil between the working chamber 83 and the low pressure oil line 18 (the operating oil is not discharged to the high pressure oil line 16). The pump control unit 34 may perform a stop control to stop the hydraulic pump 12 by opening and closing the high pressure valve 86 and the low pressure valve 88.

As shown in FIG. 4, the hydraulic motor 14 may be configured with a plurality of working chambers 93 formed by cylinders 90 and pistons 92, an eccentric cam 94 with a cam curve which engages with the pistons 92, and a high pressure valve 96 and a low pressure valve 98 which are provided for each working chamber 93. The high pressure valve 96 is arranged in a high pressure communication path 97 between each working chamber 93 and the high pressure oil line 16. The low pressure valve 98 is arranged in a low pressure communication path 99 between each working chamber 93 and the low pressure oil line 18. Herein, electromagnetic valves may be used as the high pressure valve 96 and the low pressure valve 98.

During operation of the hydraulic motor 14, the pressure difference generated by the hydraulic pump 12 between the high pressure oil line 16 and the low pressure oil line 18 causes the piston 92 to move up and down periodically. The piston 92 repeats a motor stroke where the piston 92 moves from the top dead center to the bottom dead center and an exhaust stroke where the piston 92 moves from the bottom dead center to the top dead center. During the operation of the hydraulic motor 14, the volume of the working chamber 93 formed by the piston 92 and an inner wall of the cylinder 90 changes periodically.

In the hydraulic motor 14, a state of each working chamber 93 can be switched between an active state and an idle state by controlling opening and closing of the high pressure valve 96 and the low pressure valve 98. When the working chamber 93 is in the active state, the high pressure valve 96 is opened and the low pressure valve 98 is closed in the motor stroke to feed the operating oil into the working chamber 93 from the high pressure oil line 16, and the high pressure valve 96 is closed and the low pressure valve 98 is opened in the exhaust stroke to discharge the operating oil having worked in the working chamber 93 to the low pressure oil line 18. In contrast, when the working chamber 93 is in the idle state, the high pressure valve 96 is kept closed and the low pressure valve 98 is kept open in both the motor stroke and the exhaust stroke, to circulate the operating oil between the working chamber 93 and the low pressure oil line 18 (the high pressure oil from the high pressure oil line 16 is not accepted into the working chamber 93). The motor control unit 35 may perform a stop control to stop the hydraulic motor 14 by opening and closing the high pressure valve 96 and the low pressure valve 98.

As shown in FIG. 2, a branch line 63 is connected to the high pressure oil line 16 and a high pressure accumulator 64 is connected to the branch line 63. Between the high pressure oil line 16 and the high pressure accumulator 64, an electromagnetic valve 65 may be provided. Further, the pressure of the accumulator 64 is obtained by a pressure sensor 68.

In a similar manner, a low pressure accumulator 69 is connected to the low pressure oil line 18 via the branch line. Between the low pressure oil line 18 and the low pressure accumulator 69, an electromagnetic valve may be provided. The low pressure accumulators 64, 69 are provided for the purpose of pressure accumulation, pulsation prevention and the like.

Between the high pressure accumulator 64 and the low pressure accumulator 69, a bypass line 66 is provided to communicate with the accumulators 64, 69. A bypass valve 67 is provided in the bypass line 66. By opening the bypass valve 67, at least a part of the high pressure oil accumulated in the high pressure accumulator 64 is supplied to the low pressure accumulator 69.

Between the high pressure oil line 16 and the low pressure oil line 18, a bypass line 60 is provided to bypass the hydraulic motor 14. In the bypass line 60, a relief valve 62 is provided to maintain the operating oil in the high pressure oil line 16 not greater than a set pressure.

In the hydraulic transmission, an oil tank 70, a replenishment line 71, a boost pump 72, an oil filter 73, a return line 74, and a low pressure relief valve 75 are provided.

The oil tank 70 stores operating oil for replenishment. The replenishment line 71 connects the oil tank 70 to the low pressure oil line 18. The boost pump 72 is provided in the replenishment line 71 to replenish the low pressure oil line 18 with operating oil from the oil tank 70.

The return line 74 is arranged between the oil tank 70 and the low pressure oil line 18. The low pressure relief valve 75 is provided in the return line 74 to maintain the operating oil in the low pressure oil line 18 at or below a set pressure.

Further, a head tank 78 where lubricant oil is stored and a bearing lubricant oil line 77 are provided. The bearing lubricant oil line 77 is provided to supply the lubricant oil from the head tank 78 to bearings of the rotation shaft 8 and the output shaft 15. In the bearing lubricant oil line 77, a pump (not shown) is provided to pump the lubricant oil to the bearings. FIG. 2 shows the case where the lubricant oil is supplied to the rotation shaft 8 alone. Via the bearing lubricant oil line 77*m* the lubricant oil is supplied from the head tank 78 to the bearings of the rotation shaft 8 and the output shaft 15. Further, the lubricant oil in the heat tank 78 may be supplied to sliding elements of other components of the wind turbine generator as well. Furthermore, the head tank 78 may be sealed in such a state that the head tank 78 is maintained at a prescribed pressure. On an upstream side of the bearing lubricant oil line 77, a pressure sensor 79 (shown on the shaft in a simple form in FIG. 2) for measuring the pressure of the lubricant oil supplied to the bearing. Instead of the pressure sensor 79, a measuring device for directly measuring the amount of the lubricant oil such as a fluid level sensor may be provided. In such a case that the bearing is a bearing of a grease inclusion type, the bearing may not be formed with the above configuration.

The wind turbine generator 1 may be provided with a variety of measuring devices such as rotation speed sensors 32 and 34 and pressure sensors 31, 68, 79. The rotation speed sensor 32 measures the rotation speed of the rotation shaft 8. The rotation speed sensor 34 measures the rotation speed of the output shaft 15 of the hydraulic motor 14. The pressure sensor 31 measures the pressure of the operating oil (the high pressure oil) in the high pressure oil line 16. The pressure sensor 68 measures the pressure of the operating oil in the high pressure accumulator. The pressure sensor 79 measures the pressure of the lubricant oil.

The stop control in the wind turbine generator 1 with the above structure is now explained in details.

Generally, in the wind turbine generator, occurrence of a fault even different from the state of the normal operation tends to cause damages, life decline, or performance decline of the devices and sometimes makes it difficult to ensure the safety. Therefore, it is necessary to stop the wind turbine generator 1 depending on contents and seriousness of the fault event.

In view of this, in the wind turbine generator 1 of the embodiments, when the fault event occurs, the wind turbine generator 1 is stopped appropriately by the stop control unit 40 described later.

The stop control unit 40 detects the fault even from a state value indicating an operation state of the wind turbine generator 1 and performs the stop control in correspondence to the fault event. The fault event here indicates an event that occurs mainly in components of the wind turbine generator 1 but may also include an event that occurs in devices around the wind turbine generator 1 such as a power failure.

The stop control unit 40 is provided with an operation state determination unit 41, a memory unit 45, a stop mode determination unit 50, a hard-wired command output unit 51, a software command output unit 52 and a grid state determination unit 49.

The memory unit 45 includes a threshold storage part 46 and a stop mode storage part 47. The memory unit 45 stores a variety of set values and thresholds used in the stop control unit 40.

Figure 5:
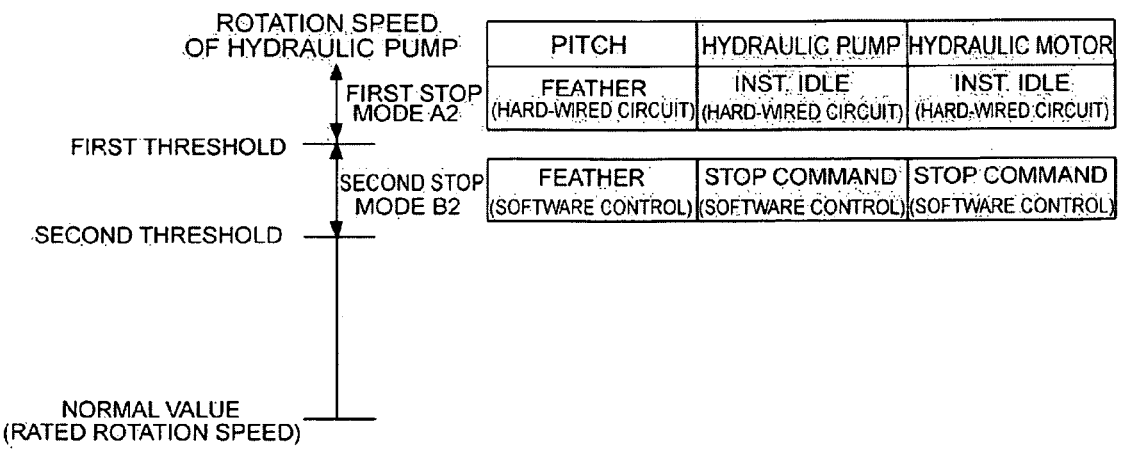
FIG. 5 shows a stop control in such a case that a state value is a rotation speed of the hydraulic pump.
Figure 6:
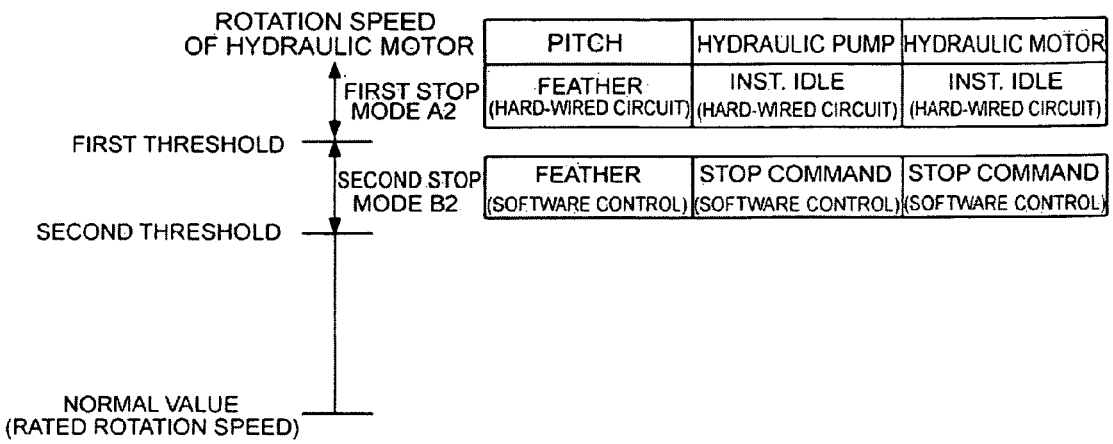
FIG. 6 shows a stop control in such a case that the state value is a rotation speed of the hydraulic motor.
Figure 7:
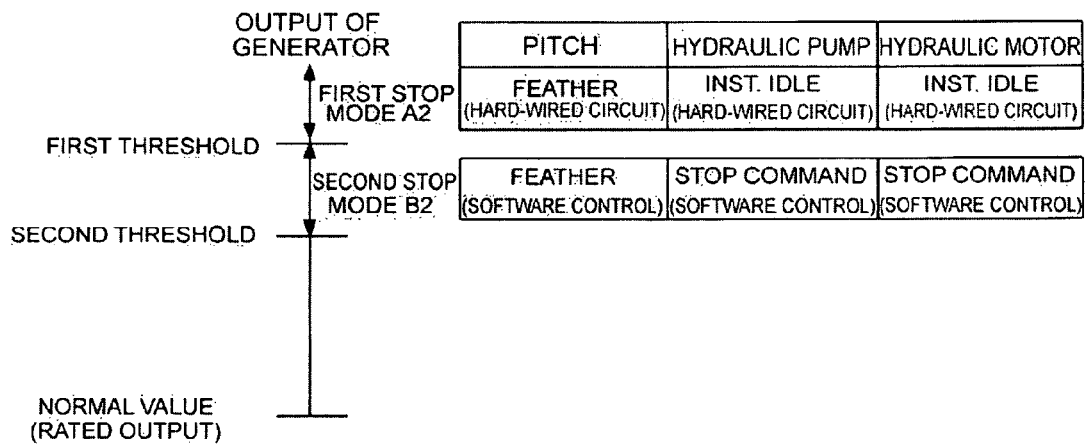
FIG. 7 shows a stop control in such a case that the state value is an output of a generator.

The threshold storage part 46 stores a first threshold and a second threshold which correspond to state values. The first threshold is greater than a normal value being a state value during the normal operation, and is a boundary value which exceeds an allowable state value for the normal operation and beyond which an emergency stop is needed. The second threshold is greater than the normal value and less than the first threshold, i.e. closer to the normal value than the first threshold. Between the second threshold and the first threshold, the emergency stop is not necessarily needed and the wind turbine generator may continue its operation. However, if this condition continues, the operation may be affected. These thresholds are set in correspondence to the state values as shown in FIG. 5 through FIG. 7. These thresholds are stored in the threshold storage part 46. The state value is, for instance, the rotation speed of the hydraulic pump 12, the rotation speed of the hydraulic motor 14, the output of the generator 20 or the like.

The stop mode storage part 47 stores a plurality of stop modes for respective types of state values. Each of the stop modes is set such that a controlled object and a content of the stop control for the controlled object are matched. For each type of the state values, set is a two-stage stop mode including at least a first stop mode and a second stop mode in correspondence to a deviation of the state value from a normal value.

The first stop mode is applied when the deviation of the state value from the normal value is not less than the first threshold. With the first stop mode being applied, at least one of the followings is performed by means of a hard-wired circuit: switching the hydraulic pump 12 to an idle state; switching the hydraulic motor 14 to an idle state; and switching the pitch angle toward a feathering position using the pitch drive mechanism 5.

The second stop mode is applied when the deviation of the state value from the normal value is not less than the second threshold and less than the first threshold. With the second stop mode being applied, all of the followings are performed by a software control: switching the hydraulic pump 12 to the idle state; switching the hydraulic motor 14 to the idle state; and switching the pitch angle toward the feathering position.

The operation state determination unit 41 determines whether or not the fault event requiring the stop control occurs in the wind turbine generator 1 based on the state value inputted from the measuring devices. Herein, the operation state determination unit 41 is formed by a deviation calculation part 42 and a comparison part 43.

The deviation calculation part 42 calculates a deviation of the state value inputted from the measuring devices from the normal value.

The comparison part 43 compare the deviation calculated in the deviation calculation part 42 to the first threshold and the second threshold stored in the threshold storage part 46.

The stop mode determination unit 50 determines a stop mode based a comparison result by the comparison part 43 and then, extracts a corresponding stop mode from the stop mode storage part 47.

Among the control contents of the stop mode determined in the stop mode determination unit 50, the hard-wired command output unit 51 outputs a command regarding the control performed by means of hard-wired circuit to a corresponding controlled object. The hard-wired circuit, herein, refers to a circuit configured to perform the command by a physical wire connection by connecting hardware such as a relay and a switch by an electric wire.

Among the control contents of the stop mode determined in the stop mode determination unit 50, the software command output unit 52 outputs a command regarding the control performed by software control to a corresponding controlled object. The software control, herein, refers to performing the command by program manipulation in a processing unit.

The grid state determination unit 49 determines whether or not whether the fault even occurs in the grid by obtaining the state of the grid 25. For instance, when the voltage of the grid 50 declines, the gird state determination unit 49 determines that the power failure occurs in the grid, which is one type of the fault event. The grid state determination unit 49 preferably uses a voltage sensor which measures the voltage of the grid 25. However, this is not limitative and instead of the voltage sensor, a power-factor meter or a reactive volt-ampere meter may be used to indirectly determine the state of the grid state of the grid 25.

In a manner similar to the operation state determination unit 41, the stop mode is determined by the stop mode determination unit 50 based on the determination result by the grid state determination unit 49 and each command is outputted from the hard-wired command output unit 51 or the software command output unit 52.

Examples of the stop controls for respective controlled objects are now described in reference to FIG. 5 to FIG. 7. In the following examples, the controlled objects of the stop controls are the pitch of the blade 4, the hydraulic pump 12 and the hydraulic motor 14. However, the controlled objects are not limited to this, and other controlled objects and control contents may be included as well.

FIG. 5 shows a stop control in such a case that the state value is a rotation speed of the hydraulic pump. As shown in FIG. 5, in the case where the rotation speed of the hydraulic pump 12 is the state value, a rated rotation speed of the hydraulic pump 12 may be used as the normal value. Further, the first threshold is set greater than the normal value and the second threshold is set greater than the normal value and smaller than the first threshold.

In such case, when the rotation speed of the hydraulic pump 12 is not less than the first threshold, a first stop mode A1 is applied. In the first stop mode A1, the control content for each controlled object is: switching the pitch angle of the blade 4 toward the feathering position by the hard-wired circuit; switching the hydraulic pump 12 instantaneously to the idle state by the hard-wired circuit; and switching the hydraulic motor 14 instantaneously to the idle state by the hard-wired circuit.

In contrast, when the rotation speed of the hydraulic pump 12 is not less than the second threshold and less than the first threshold, a second stop mode B1 is applied. In the second stop mode B1, the control content for each controlled object is: switching the pitch angle of the blade 4 toward the feathering position by the software control; stopping the hydraulic pump 12 by the software control; and stopping the hydraulic motor 14 by the software control.

FIG. 6 shows a stop control in such a case that the state value is the rotation speed of the hydraulic motor. The setting of the thresholds and the stop controls are substantially the same as the case of the hydraulic pump 12 illustrated in FIG. 5 and thus, are not explained further in details. In a first stop mode A2, the stop control is mainly performed by the hard-wired circuit, whereas, in a second stop mode B2, the stop control is mainly performed by the software control.

In FIG. 5 and FIG. 6, in the first stop mode, when the state value is not less than the first threshold, both the hydraulic pump 12 and the hydraulic motor 14 are instantaneously stopped by the hard-wired circuit. However, this is not limitative and whichever of the hydraulic pump 12 and the hydraulic motor 14 where there is no fault event, may be controlled by the software control or may continue its normal operation for a prescribed period of time and then stopped.

Further, in such a case that the rotation speed of the hydraulic motor 14 is the state value, the first threshold may be set lower than a rotation speed of the hydraulic motor 14 corresponding to a maximum rotation speed of the generator 20 expected in such a case that the fault event occurs when the generator 20 operating at the rated load is disconnected from the grid 25. By this, even if the generator 20 is disconnected from the grid 25, it is possible to stop the generator 20 before reaching the expected maximum rotation speed, thereby preventing the generator 20 from being damaged.

FIG. 7 shows a stop control in such a case that the state value is the output of the generator. As shown in FIG. 7, in such a case that the state value is the output of the generator 20, the normal value may be the rated output of the generator 20. Further, the first threshold is set greater than the normal value and the second threshold is set greater than the normal value and smaller than the first threshold.

In such case, when the output of the generator 20 is not less than the first threshold, a first stop mode A3 is applied. In the first stop mode A3, the control content for each controlled object is: switching the pitch angle of the blade 4 toward the feathering position by the hard-wired circuit; switching the hydraulic pump 12 instantaneously to the idle state by the hard-wired circuit; and switching the hydraulic motor 14 instantaneously to the idle state by the hard-wired circuit.

In contrast, when the output of the generator 20 is not less than the second threshold and less than the first threshold, a second stop mode B3 is applied. In the second stop mode B3, the control content for each controlled object is switching the pitch angle of the blade 4 toward the feathering position by the software control; stopping the hydraulic pump 12 by the software control; and stopping the hydraulic motor 14 by the software control.

Figure 8:
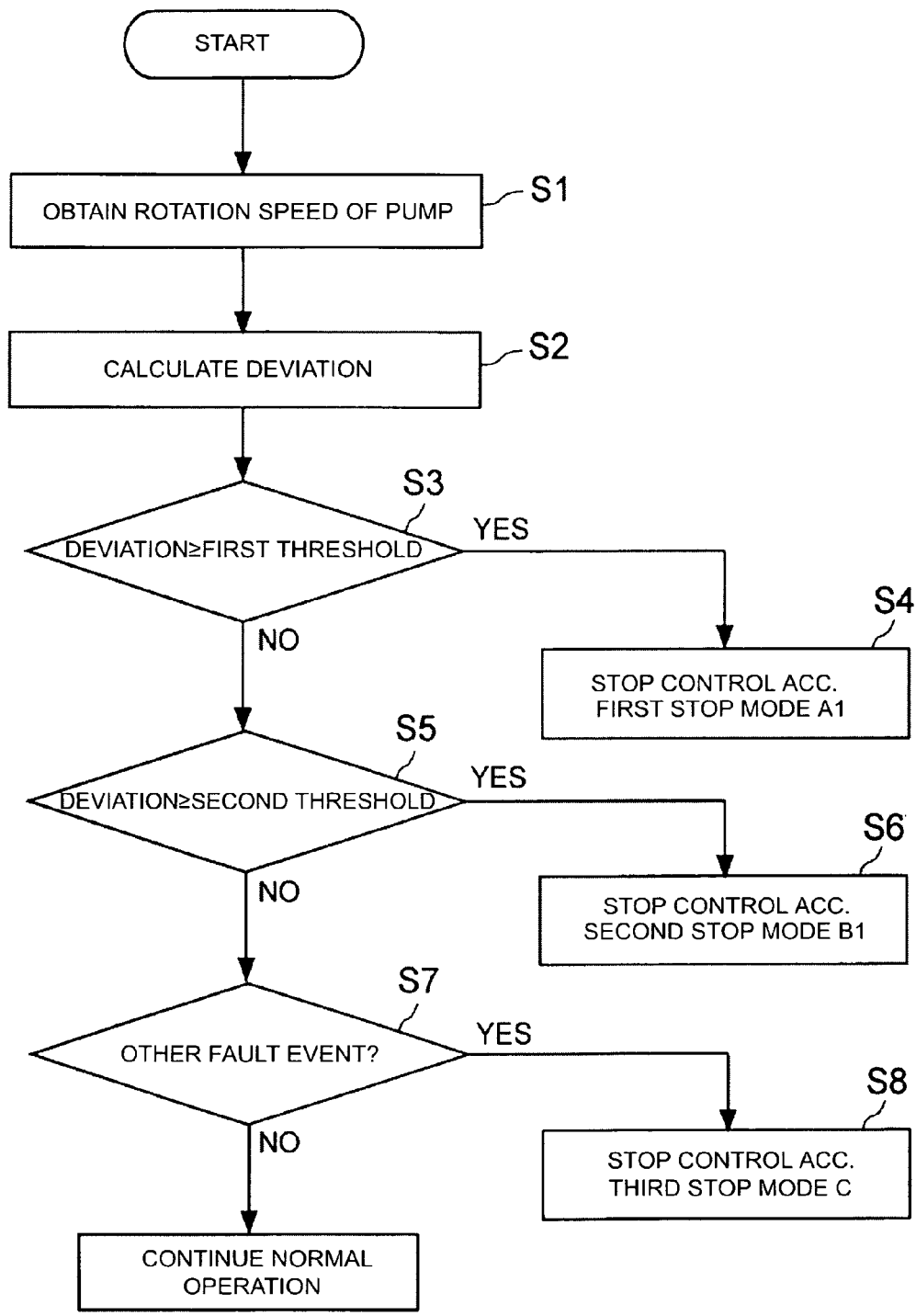
FIG. 8 is a flow chart illustrating an example of the stop control of the wind turbine generator.

In reference to the flow chart illustrated in FIG. 8, an example of the stop control of the wind turbine generator 1 is explained. In the example, the rotation speed o the hydraulic pump 12 is used as the state value indicating the operation state of the wind turbine generator 1.

First, in a step S1, the operation state determination unit 41 obtains the rotation speed of the hydraulic pump 12. The rotation speed of the hydraulic pump 12 may be a rotation speed of the rotating shaft 8 measured by the rotation. In a step S2, the deviation calculation part 42 of the operation state determination unit 41 calculates the deviation of the rotation speed of the hydraulic pump 12 obtained in the step S1 from the normal value which is the rotation speed during the normal operation.

Next, in a step S3, the comparison part 43 compares the deviation to the first threshold. In the case where the deviation is not less than the first threshold, the stop mode determination unit 50 selects the first stop mode A1 corresponding to the rotation speed of the hydraulic pump 12 and extracts the controlled object and the control contents corresponding to the first stop mode A1 from the stop mode storage part 47.

In a step S4, the stop control is performed in accordance to the first stop mode A1. More specifically, among the control contents of the first stop mode A1, a command regarding the stop control performed by means of hard-wired circuit is outputted from the hard-wired command output unit 51 to a control unit of each controlled object. Meanwhile, a command regarding the stop control performed by the software control is outputted from the software command output unit 52 to a control unit of each controlled object. For instance, in such a case that the controlled object is the pitch angle of the blade 4 and the control content is to switch the pitch angle toward the feathering position by the hard-wired circuit, the hard-wired command output unit 51 sends the command to the pitch control unit 33. Then, based on the command, the pitch control unit 33 generates a control signal to control the pitch dive mechanism 5. Further, in such a case that there are two types of the pitch drive mechanism 5, one for high speed and the other for normal speed, the pitch drive mechanism 5 for the high speed may be used in the first stop mode to control the pitch angle in order to perform the stop control quickly.

When it is determined in the step S3 that the deviation is less than the first threshold, the deviation is then compared to the second threshold in the comparison part 43. In the process, in such a case that the deviation is less than the second threshold, the stop mode determination unit 50 selects the second stop mode B1 corresponding to the rotation speed of the hydraulic pump 12 and extracts the controlled object and the control contents corresponding to the second stop mode B1 from the stop mode storage part 47.

Then, in a step S6, the stop control is performed in accordance to the second stop mode B1. In this process, in a manner similar to the first stop mode A1, a command is outputted to the control unit of each controlled object from the hard-wired command output unit 51 or the software command output unit 52 in accordance to the control contents.

Figure 9:
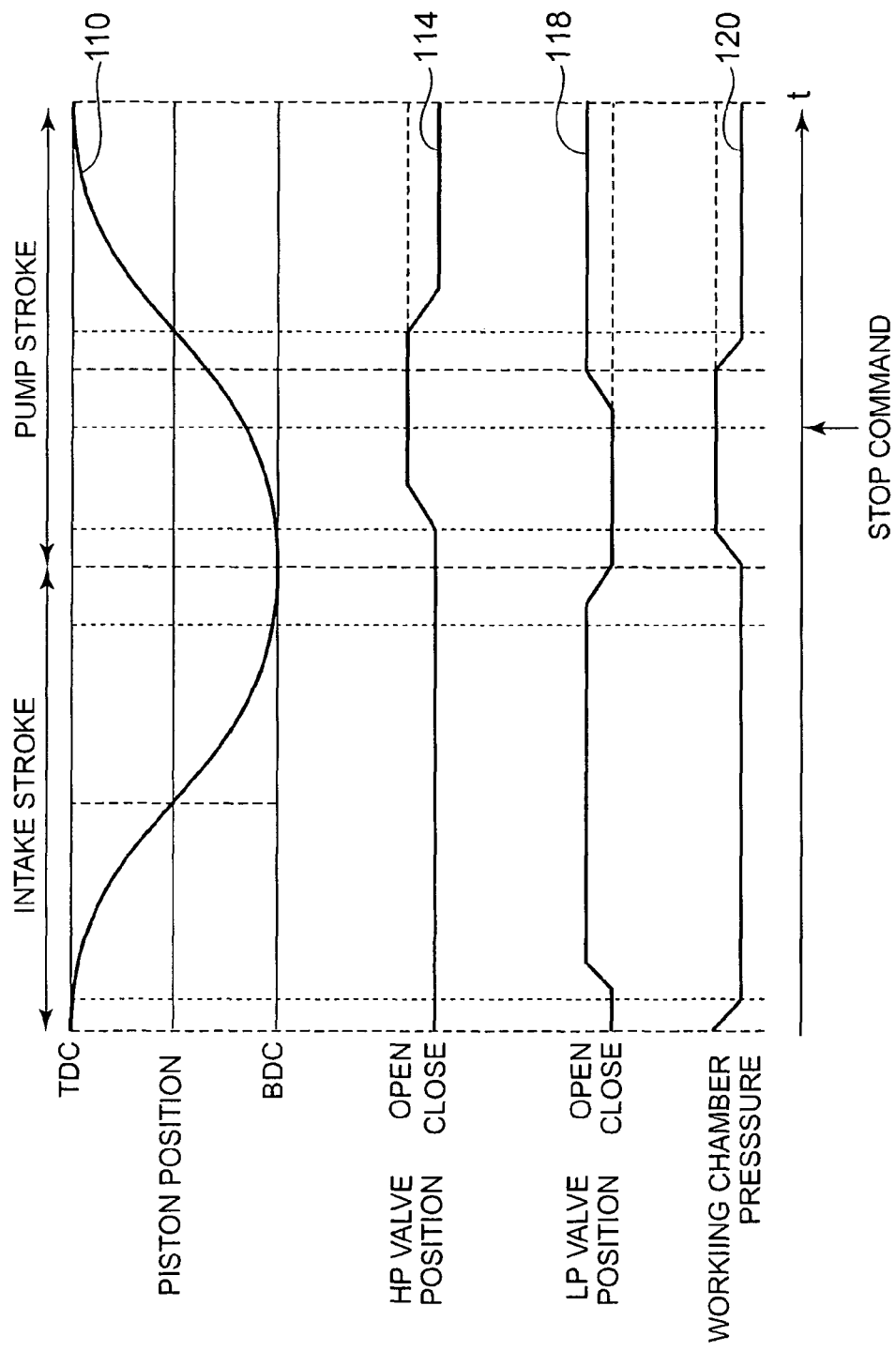
FIG. 9 shows an opening/closing timing of each valve of the hydraulic pump during the stop control.

In reference to FIG. 9, a specific behavior of the hydraulic pump 12 during the stop control is described. FIG. 9 shows an opening/closing timing of each valve of the hydraulic pump during the stop control. In the hydraulic pump 12 illustrated in FIG. 3, when the cam rotates with the rotation shaft, the piston 82 moves up and down periodically as shown with a piston cycle curve 110 of FIG. 9. The piston 82 repeats a pump stroke where the piston 82 moves from the bottom dead center to the top dead center and an intake stroke where the piston 82 moves from the top dead center to the bottom dead center. In FIG. 9, the piston cycle curve 110 is shown with time t on the horizontal axis and represents a position change of the piston 82 with the passage of time.

The high pressure valve 86 is a check valve which is opened and closed by the pressure difference between the working chamber 83 and the high pressure oil line 16. Thus, during the normal operation, the opening and closing of the high pressure valve 86 depends on the pressure of the working chamber 83. More specifically, the high pressure valve 86 automatically opens as indicated by a high pressure valve position 114 when the pressure in the working chamber 83 (see a pressure curve 120) increases and exceeds the pressure in the high pressure oil line 16, and then the high pressure valve 86 automatically closes as the pump stroke is completed. In contrast, as indicated by a low pressure valve position 118, the low pressure valve 88 is closed just before the piston 82 reaches the bottom dead center and then opens just after the piston 82 reaches the top dead center. By this, the pressure in the working chamber 83 decreases in the intake stroke and increases in the pump stroke. The case where the normal operation is continued instead of performing the stop control is indicated by horizontal dotted line in FIG. 9.

In such a case that the fault event is detected during the pump stroke and the first stop mode is applied, as shown in FIG. 9, the pump control unit 34 opens the low pressure valve 88 at a timing of receiving the stop command from the hard-wired command output unit 51. By this, the pressure in the working chamber 83 decreases and the high pressure valve 86 is closed. In this process, the low pressure valve 88 and the high pressure valve 85 may be forcibly closed by the hard-wired circuit.

In contrast, in such a case that the second stop mode is applied, after receiving the stop command from the software command output unit 52, the pump control unit 34 maintains a state of the low pressure valve 88 and then at a next timing of the piston 82 reaching the bottom dead center, opens the low pressure valve 88 (not shown). By this, the pressure in the working chamber 83 decrease, thereby closing the high pressure valve 86.

In this manner, in the first stop mode A1, all of the working chambers of the hydraulic pump 12 are simultaneously switched to the disabled state so as to stop the hydraulic motor 12 instantaneously. This ensures the safety. In the second stop mode B1, the working chambers 82 are switched to the disabled state sequentially. This avoids unexpended load acting thereon, hence avoiding the life reduction of the hydraulic pump 12.

In the stop controls of the steps S4 and S6, the following stop control for the hydraulic pump 12 may be performed.

In such a case that the fault event where the first stop control mode and the second control mode are applied occurs in the hydraulic pump 12, the stop control unit 40 switched the hydraulic pump 12 to the idle state and maintains the hydraulic motor 14 in an operation state for at least a set period of time even after the hydraulic pump 12 is switched to the idle state.

In this manner, when the fault even occurs in the hydraulic pump 12, the hydraulic motor 14 is maintained in the operation state for the set period of time. By this, the generator 20 continues to operate until the hydraulic motor 14 is switched to the idle state, thereby improving the power generation efficiency. Further, in such a case that the fault event occurs in the hydraulic motor 14, the hydraulic pump 12 is maintained in the operation state for the set period of time. By this, a controlling force by the hydraulic pump 12 is applied to the rotor 2 while the hydraulic pump 12 is still operating, thereby assisting the pitch brake.

In addition to the stop controls based on the state value, following stop controls may be performed.

After it is determined by the comparison part 43 in the step S5 that the state value is less than the second threshold, the process advances to a step S7 to determine whether or not there are other fault event. When it is determined that there is other fault event such as the power failure in the grid 25 determined by the grid state determination unit, the stop mode determination unit 50 selects a third stop mode C and extracts the controlled object and the control contents corresponding to the third stop mode C from the stop mode storage part 47. Then, in a step S8, the stop control is performed in accordance to the third stop mode C. Meanwhile, in a manner similar to the first and second stop modes, a command is outputted to the control unit of each controlled object from the hard-wired command output unit 51 or the software command output unit 52.

In this manner, even when the state value is less than the second threshold, the stop control is performed depending on the fault event and with the above configuration of the three-stage stop control, the reliability of performing the stop control is improved.

In reference to FIG. 10, specific examples of other fault events where the third stop mode is applied and the corresponding controlled objects and contents are explained. FIG. 10 shows the fault events when the third stop mode is applied and the corresponding stop controls.

The following control is performed when the fault even is power failure in the grid 35.

When there is power failure in the grid 25 to which the generator 20 is coupled, the stop control unit 40 switches the hydraulic motor 12 to the idle state and disconnects the generator 20 from the grid 25. By this, it is possible to prevent the over-rotation of the generator 20.

In this process, the hydraulic motor 14 is switched to the idle state and the pitch angle of the blade is switched toward the feathering position by actuation of the pitch drive unit 5 and after switching of the hydraulic motor to the idle state and the pitch angle toward the feathering position, the hydraulic pump 1 may be maintained in the operation state. As the pressure rises in the high pressure oil line 16 due to the shutdown of the hydraulic motor 14, the hydraulic pump 12 may be gradually shifted toward the shutdown state and ultimately to the idle state. As described above, when the power fails in the grid 25, the hydraulic motor 14 is switched to the idle state to protect the hydraulic motor 12 and the generator and also the pitch brake is activated by the pitch drive mechanism to control the pitch angle toward such a position as to stop the rotation of the rotor. Thus, it is possible to ensure the safety. Meanwhile, the hydraulic pump 12 is maintained in the operation state even after the above switching process. By this, a controlling force by the hydraulic pump 12 is applied to the rotor 2 while the hydraulic pump 12 is still operating, thereby assisting the pitch brake.

In such a case that the fault event is a pressure drop in the high pressure oil line 16, the following control is performed.

In the case where the pressure in the high pressure oil line 16 is lower than a set lower limit for a set period of time, there is a possibility of leaking of the operating oil and thus, the pitch angle is switched toward the feathering position by actuation of the pitch drive unit 5 and the hydraulic pump 12 and the hydraulic motor 14 are switched to the idle state. By this, it is possible to protect the bearings of the rotation shaft 8, the output shaft 15 and the like. In this process, the hydraulic pump 12 is gradually shifted toward the shutdown state in response to reduction of the input torque and the rotation speed by the pitch brake, and ultimately to the idle state. In contrast, the hydraulic motor 14 is gradually shifted toward the shutdown state in response to the pressure decline in the high pressure oil line, and ultimately switched to the idle state.

In such a case that the fault event is a decrease in the amount of the lubricant oil in the head tank, the following control is performed.

In the case where one of the pressure and the amount of the lubricant oil in the head tank 78 drops below the set value, the pitch angle is switched toward the feathering position by actuation of the pitch drive unit 5 and the hydraulic pump 12 and the hydraulic motor 14 are switched to the idle state.

When the lubricant oil leaks from the head tank 78 or its piping, the lubricant oil is not supplied sufficiently to the bearings of the rotation shaft 8 and the output shaft 15 and thus, the bearings are prone to damages. To avoid this, when one of the pressure and the amount of the lubricant oil in the head tank 78 drops below the set value, the stop control is performed by switching the pitch angle toward the feathering position by actuation of the pitch drive unit 5 and also by switching the hydraulic pump 12 and the hydraulic motor 14 to the idle state. By this, it is possible to shutdown the wind turbine generator 1 before the bearings are damaged. In this process, the hydraulic pump 12 is gradually shifted toward the shutdown state in response to reduction of the input torque and the rotation speed by the pitch brake, and ultimately switched to the idle state. In contrast, the hydraulic motor 14 is gradually shifted toward the shutdown state in response to the pressure decline in the high pressure oil line 16, and ultimately switched to the idle state.

In such a case that the fault event is an increase of the pressure in the high pressure accumulator 64, the following control is performed.

In the case where the pressure in the high pressure accumulator 64 exceeds the set value, the operation oil is released to the low pressure accumulator 69 from the high pressure accumulator 64 via the bypass line 66. This reduces the pressure in the high pressure accumulator. Further, when this fault even occurs, the generator 20, the hydraulic pump 12 or the hydraulic motor 14 may continue its normal control.

In the above embodiments, the state value indicating the operation state of the wind turbine generator 1 is obtained and depending on a degree of the deviation of the state value from the normal value, different stop control is performed. More specifically, when the deviation of the state value is not less than the first threshold and the fault event is particularly severe compared to other fault events, the stop control is performed using the hard-wired circuit. By this, the wind turbine generator 1 can be positively stopped.

In contrast, when the deviation is less than the first threshold and not less than the second threshold which is closer to the normal value than the first threshold and the operation state is comparatively close to the normal operation state among the fault events, the stop control is performed using the software control. By this, it is possible to avoid sudden stop of the devices, thereby reducing additional load on the devices. Further, by handling the situation by the software control before it gets serious enough to stop the wind turbine generator 1 by the hard-wired circuit, the wind turbine generator 1 can be stopped without excess load on the devices.

While the present invention has been described with reference to exemplary embodiments, it is obvious to those skilled in the art that various changes may be made without departing from the scope of the invention.

In the above embodiments, mainly explained are the cases where the state value is the rotation speed of the hydraulic pump. However, the state value is not limited to this, and may be the rotation speed of the hydraulic motor 14, the output of the generator 20 or the like.

The invention claimed is:

1. A power generating apparatus of renewable energy type comprising:
    a rotation shaft which is rotated with a blade by renewable energy;
    a hydraulic pump which is driven by the rotation shaft to increase a pressure of operating oil;
    a hydraulic motor which is driven by the operating oil having been pressurized by the hydraulic pump;
    a generator which is coupled to the hydraulic motor;
    a pitch drive mechanism which adjusts a pitch angle of the blade;
    a monitor unit which obtains a state value indicating an operation state of the power generating apparatus of renewable energy type; and
    a stop control unit which stops the power generating apparatus of renewable energy type when a fault event occurs,
    wherein, when a deviation of the state value obtained by the monitor unit from a normal value which is a state value during a normal operation is not less than a first threshold value, the stop control unit performs by means of a hard-wired circuit at least one of: switching the hydraulic pump to an idle state; switching the hydraulic motor to an idle state; and switching the pitch angle toward a feathering position using the pitch drive mechanism, and
    wherein, when the deviation is less than the first threshold and not less than a second threshold which is closer to the normal value than the first threshold, the stop control unit performs by software control all of: switching the hydraulic pump to the idle state; switching the hydraulic motor to the idle state; and switching the pitch angle toward the feathering position using the pitch drive mechanism.

2. The power generating apparatus of renewable energy type according to claim 1,
wherein the state value is at least one of a rotation speed of the hydraulic pump, a rotation speed of the hydraulic motor and an output of the generator.

3. The power generating apparatus of renewable energy type according to claim 1,
wherein the stop control unit switches the pitch angle toward the feathering position at a higher speed when the deviation is not less than the first threshold than when the deviation is not less than the second threshold and less than the first threshold.

4. The power generating apparatus of renewable energy type according to claim 1,
wherein the hydraulic pump comprises:
a plurality of working chambers each of which is surrounded by a cylinder and a piston and which is filled with the operating oil; and
a cam which causes the pistons of the working chambers to move upward and downward between a top dead center and a bottom dead center with phase differences,
wherein, when the deviation is not less than the first threshold, the stop control unit switches all of the working chambers simultaneously to a disabled state so as to stop the hydraulic pump instantaneously, and when the deviation is not less than the second threshold and less than the first threshold, the stop control unit switches the working chambers sequentially to the disabled state at a timing when the piston of each of the working chambers reaches the top dead center or the bottom dead center.

5. The power generating apparatus of renewable energy type according to claim 1,
wherein, when the fault event occurs in one of the hydraulic pump and the hydraulic motor, the stop control unit switches the one of the hydraulic pump and the hydraulic motor to the idle state and maintains the other of the hydraulic pump and the hydraulic motor in an operation state for a set period of time even after the one of the hydraulic pump and the hydraulic motor is switched to the idle state.

6. The power generating apparatus of renewable energy type according to claim 1,
wherein, in such a case the state value is a rotation speed of one of the hydraulic pump and the hydraulic motor and the state value is less than the second threshold, when the fault event occurs in the one of the hydraulic pump and the hydraulic motor, the pitch angle is switched toward the feathering position using the pitch drive mechanism and the one of the hydraulic pump and the hydraulic motor is switched to the idle state.

7. The power generating apparatus of renewable energy type according to claim 1,
wherein, in such a case the state value is a rotation speed of the hydraulic motor and the state value is less than the second threshold, when a power failure occurs in a grid to which the generator is connected, the stop control unit switches the hydraulic motor to the idle state and disconnects the generator from the grid.

8. The power generating apparatus of renewable energy type according to claim 7,
wherein, when the power failure occurs in the grid, the stop control unit switches the hydraulic motor to the idle state and switches the pitch angle toward the feathering position by actuation of the pitch drive unit, and maintains the hydraulic pump in an operation state even after the hydraulic motor is switched to the idle state and the pitch angle is switched toward the feathering position.

9. The power generating apparatus of renewable energy type according to claim 1, further comprising:
a high pressure oil line which connects an outlet of the hydraulic pump and an inlet of the hydraulic motor,
wherein, when a pressure of the high pressure oil line stays below a set lower limit for a predetermined period of time, the stop control unit switches the pitch angle toward the feathering position by actuation of the pitch drive unit and switches the hydraulic pump and the hydraulic motor to the idle state.

10. The power generating apparatus of renewable energy type according to claim 1,
wherein the state value is a rotation speed of the hydraulic motor, and
wherein the first threshold is set lower than a rotation speed of the hydraulic motor which corresponds to a maximum rotation speed of the generator expected in such that a case the fault event occurs when the generator during a rated load operation is disconnected from a grid.

11. The power generating apparatus of renewable energy type according to claim 1, further comprising:
a high pressure oil line which connects an outlet of the hydraulic pump and an inlet of the hydraulic motor;
a low pressure oil line which connects an inlet of the hydraulic pump and an outlet of the hydraulic motor;
a high pressure accumulator which is connected to the high pressure oil line;
a low pressure accumulator which is connected to the low pressure oil line; and
a bypass line which communicates with the high pressure accumulator and the low pressure accumulator,
wherein, when a pressure of the high pressure accumulator exceeds a set value, the stop control unit releases the operating oil from the high pressure accumulator to the low pressure accumulator via the bypass line.

12. The power generating apparatus of renewable energy type according to claim 1, further comprising:
a head tank which supplies lubricant oil to a bearing of at least one of the rotation shaft and an output shaft which connects the hydraulic motor and the generator,
wherein, when one of a pressure and an amount of the lubricant oil in the head tank becomes lower than a set value, the stop control unit switches the pitch angle toward the feathering position by actuation of the pitch drive unit and switches the hydraulic pump and the hydraulic motor to the idle state.

13. The power generating apparatus of renewable energy type according to claim 1,
wherein the power generating apparatus of renewable energy type is a wind turbine generator which generates power from wind in a form of the renewable energy.

14. A control method of a power generating apparatus of renewable energy type which comprises a rotation shaft rotated with a blade by renewable energy, a hydraulic pump driven by the rotation shaft to increase a pressure of operating oil, a hydraulic motor driven by the operating oil having been pressurized by the hydraulic pump, a generator coupled to the hydraulic motor, a pitch drive mechanism adjusting a pitch angle of the blade, the method comprising the steps of:

obtaining a state value which indicates an operation state of the power generating apparatus of renewable energy type; and stopping the power generating apparatus of renewable energy type when a fault event occurs, wherein, in the stopping step, when a deviation of the state value obtained in the obtaining step from a normal value which is a state value during a normal operation is not less than a first threshold value, at least one of: switching the hydraulic pump to an idle state; switching the hydraulic motor to an idle state; and switching the pitch angle toward a feathering position using the pitch drive mechanism, is performed by means of a hard-wired circuit, and wherein, in the stopping step, when the deviation is less than the first threshold and not less than a second threshold which is closer to the normal value than the first threshold, all of: switching the hydraulic pump to the idle state; switching the hydraulic motor to the idle state; and switching the pitch angle toward the feathering position using the pitch drive mechanism, are performed by means of software control.

* * * * *